(12) United States Patent
Behrman et al.

(10) Patent No.: US 11,916,603 B2
(45) Date of Patent: Feb. 27, 2024

(54) REDUNDANT TRANSMISSION AND RECEIVE ELEMENTS FOR HIGH-BANDWIDTH COMMUNICATION

(71) Applicant: Fathom Radiant, PBC, Boulder, CO (US)

(72) Inventors: Keith Behrman, Boulder, CO (US); J. Israel Ramirez, Denver, CO (US); Ryan Boesch, Louisville, CO (US)

(73) Assignee: Fathom Radiant, PBC, Boulder, CO (US)

( * ) Notice: Subject to any disclaimer, the term of this patent is extended or adjusted under 35 U.S.C. 154(b) by 0 days.

(21) Appl. No.: 18/193,537

(22) Filed: Mar. 30, 2023

(65) Prior Publication Data

US 2023/0327781 A1    Oct. 12, 2023

Related U.S. Application Data

(60) Provisional application No. 63/328,321, filed on Apr. 7, 2022.

(51) Int. Cl.
*H04B 10/00* (2013.01)
*H04B 10/80* (2013.01)
*H04B 10/64* (2013.01)

(52) U.S. Cl.
CPC .......... *H04B 10/802* (2013.01); *H04B 10/64* (2013.01)

(58) Field of Classification Search
CPC ........ H04B 10/03; H04B 10/07; H04B 10/25; H04B 10/64; H04B 10/802
See application file for complete search history.

(56) References Cited

U.S. PATENT DOCUMENTS

| | | | | |
|---|---|---|---|---|
| 5,612,968 A | * | 3/1997 | Zah | .............. H01S 5/4025 372/50.12 |
| 2009/0060522 A1 | * | 3/2009 | Aronson | .............. H04B 10/032 398/141 |

\* cited by examiner

*Primary Examiner* — Kevin K Pyo
(74) *Attorney, Agent, or Firm* — Macheledt Bales LLP; Jennifer L. Bales

(57) ABSTRACT

Arrays of optical emitters, modulators, receivers and/or optoelectronic devices used in communication are printed with redundant elements to provide multiple solutions to select from at screening time to improve overall yield. Multiple optoelectronic devices are printed on common chiplets, tightly packed, or printed in sub-arrays.

19 Claims, 4 Drawing Sheets

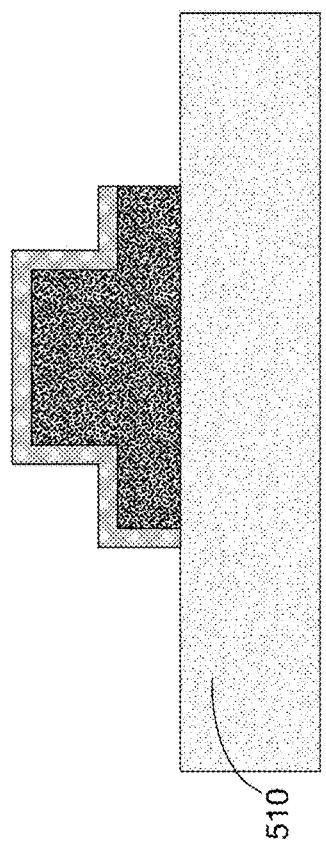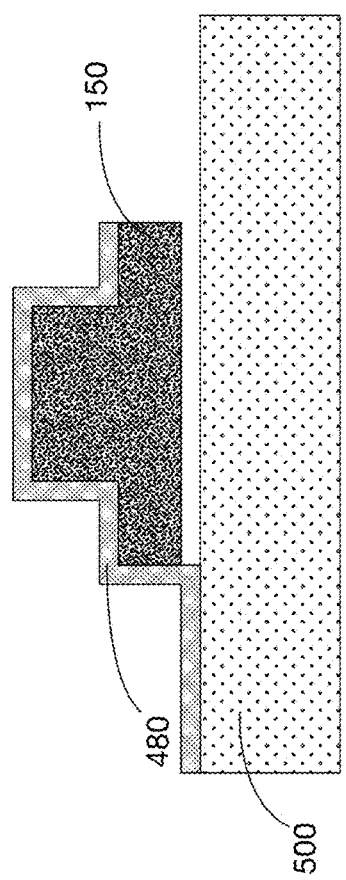

REDUNDANT TRANSMISSION AND RECEIVE ELEMENTS FOR HIGH-BANDWIDTH COMMUNICATION

This application relates to U.S. patent application Ser. No. 18/193,549, entitled "Methods and Apparatus for Fault Tolerance in Multi-Wavelength Optical Interconnect Networks" by inventors Soheil Hashemi, Ryan Boesch, Amandeep Singh, and David R. Thomas, and filed concurrently herewith, which application is hereby incorporated herein by reference.

This application claims the benefit of U.S. Patent Application 63/328,321, filed 7 Apr. 2022, and incorporates it by reference.

BACKGROUND OF THE INVENTION

Field of the Invention

The present invention relates to redundant transmission and receiver elements for high-bandwidth communication.

Discussion of Related Art

Arrays of optical emitters, modulators, receivers, and/or other optoelectronic devices used in communication have a time-varying failure rate which is the result of multiple failure mechanisms (e.g. manufacturing yield, assembly yield, infant mortality, and lifetime). As an example, an array of 1000 devices might have a 1% device failure rate at end-of-life, which would mean the expected number of failed devices would be 10 per array. Even a 0.1% device failure rate results in one expected device failure per array. Often, redundant optoelectronic devices are placed adjacent to one another to allow for an increase in overall lifetime by being able to tolerate a single device failure. Current technologies use die-sized optoelectronic devices that can place adjacent redundant devices greater than 100 microns apart from one another. This creates optical challenges to have a primary device and a redundant device focused into the same optical system. Similarly, micro light-emitting diode displays will employ redundant pixels to account for failed devices without interruption to the display picture as the human eye is less sensitive to small perturbations in the display when viewed at a distance.

SUMMARY OF THE INVENTION

Redundant emitters and detectors are heterogeneously integrated on an electronics backplane or substrate to provide multiple solutions for device operation to improve overall yield. An example involves mass-transfer printed emitters and detectors that consist of multiple emitting devices and/or multiple receiving devices on one chiplet. The multiple device chiplet is stacked on a standard silicon logic process to improve the yield by down-selecting to the best subarray during screening.

The subarrays are screened during link training to identify functional redundant lanes and non-functional primary lanes and then re-routing the non-functional primary lanes to functional redundant lanes. When a lane failure occurs during operation, the link is brought down and re-trained to re-route the newly failing lane to a redundant lane.

An optoelectronic device includes a first array of optical elements (optical emitters, photodetectors, and/or modulators) formed on a substrate, a second array of optical elements formed on the substrate, and a mechanism for selecting and activating optical elements of the first array or selecting and activating optical elements of the second array. Each element from the first array forms a pair with an element from the second array and each pair of elements is enough together that an adjacent optical system can accept signals from either the first array or the second array without adjustment. Three or four or more arrays maybe be formed close together on the substrate and any of them may be selected.

One of the arrays of elements may be reserved as cold spares to extend the system lifetime. Pairs may be formed on the same chiplet or separate chiplets, and may be mesas of various shapes. Pairs may be isolated mesas (e.g. by ion implantation, doping profiles, or etching) formed on one chiplet and form a three-terminal device.

Often the arrays are interleaved, for example in a grid pattern or an alternating line. An array may be selected and activated during a yield screening process. The device may be attached to a driving backplane made of a flexible material.

Other embodiments also have arrays of optical elements on a substrate and a method of selecting which array to activate, by the adjacent optical system is adjusted to align with the activated array.

BRIEF DESCRIPTION OF THE DRAWINGS

FIG. 2A is a side cutaway view of an optoelectronic chiplet built from its native substrate and adhered to that substrate by means of a tether after an undercut etch.

FIG. 2B is a side cutaway view of the optoelectronic chiplet from FIG. 2A transferred onto a different substrate.

DETAILED DESCRIPTION OF THE INVENTION

Figures 1A, 1B, 1C, 1D:
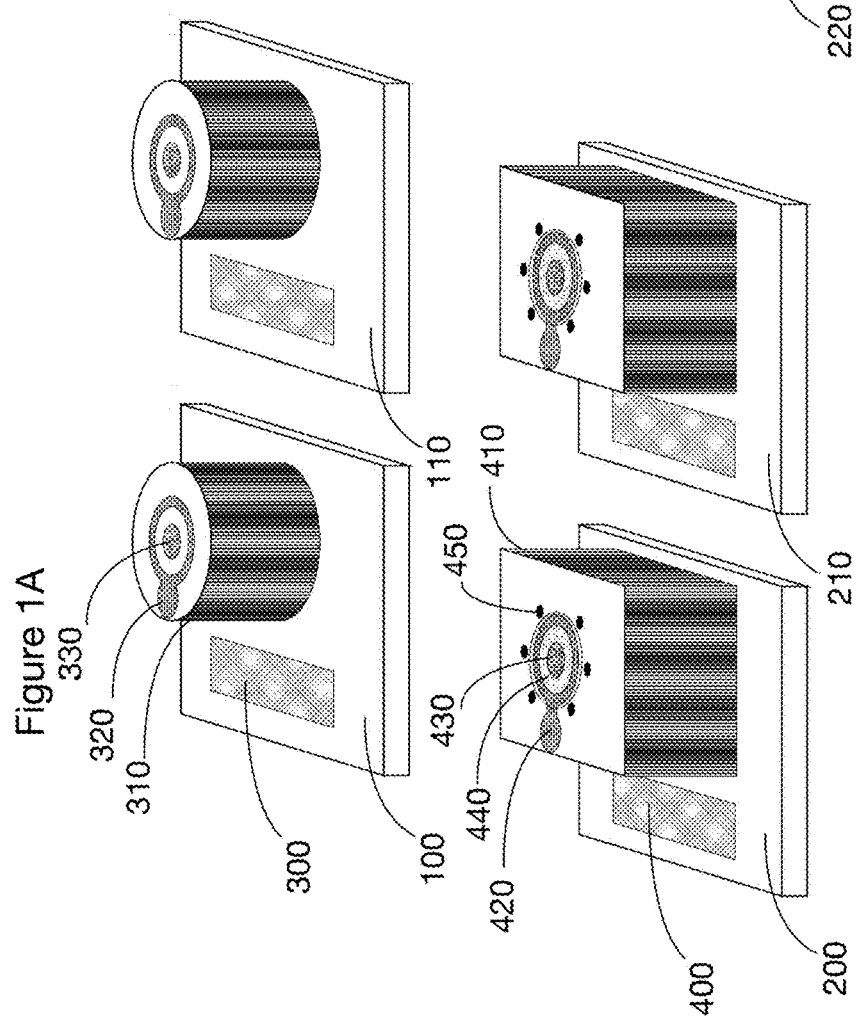
FIG. 1A is a drawing of two optoelectronic emitter devices with circular mesa shapes on separate chiplets.
FIG. 1B is a drawing of two optoelectronic emitter devices with circular mesa shapes on one combined chiplet.
FIG. 1C is a drawing of two optoelectronic emitter devices with rectangular mesa shapes on separate chiplets. Current is confined to the center of the mesa with an ion implantation process.
FIG. 1D is a drawing of two optoelectronic emitter devices with a shared rectangular mesa shape on one combined chiplet. Current is confined to each respective emitter region with an ion implantation process.

FIGS. 1A-1D show examples where two vertical-cavity surface-emitting lasers (VCSEL) can be placed in an adjacent matter for use as a primary and secondary, redundant, device. FIG. 1A depicts two generally identical but separate rectangular chiplets 100, 110 with a minimum length or width dimension of 10 microns ranging up to hundreds of microns that can be placed as close as conventional mass-transfer printed and packaging methods will allow but generally is equal to or greater than a 5 micron space between chiplets. Chiplets could also be of non-rectangular shapes containing more than two sides with no minimum dimension per side but of similar length and width dimensions as described before.

FIG. 1A shows chiplets each containing emission apertures 330, top contacts 320 that could be either an anode or cathode that sit atop of the mesas 310, and bottom contacts 300 that are of the opposite polarity from the top contact. In this embodiment, chiplets 100 and 110 are placed via mass-transfer printing and can be placed a very close distance to one another such that it is possible to focus both optical modes from the two emitter devices into the same optical system.

FIG. 1B reduces this distance further between the two emitting optical modes by combining both mesas 310 onto the same chiplet 120. This creates a new, novel, 3 terminal device with a shared bottom contact. FIG. 1C depicts two generally identical but separate chiplets 200, 210 that can be placed close together. Each chiplet contains emission apertures 430 that are formed via oxidation of $Al_xGa_{1-x}As$ to $AlO_y$ via steam through access vias 450. For the larger rectangular mesas 410, current from the top contact 420 is confined via an ion implantation region 440. Each chiplet contains a respective bottom contact 400 that is of the opposite polarity from the top contacts. FIG. 1D shows a way to combine chiplets 200, 210 into a common configuration 220 with a shared bottom contact in a three terminal device. Here, the two emitters share a common rectangular mesa with separate top contacts where current is confined into two respective ion implantation regions. This places the two optical apertures a minimal distance from one another while allowing independent operation through addressing the respective top contacts. Though they share a common chiplet and mesa, the majority of failure modes of one device will not affect the other device thus enabling redundancy with closely distanced emitting optical modes.

FIGS. 2A and 2B shows an example of an optoelectronic chiplet mass-transfer printed from a native substrate to a different substrate. FIG. 2A depicts an optoelectronic chiplet 150 that has been formed and processed from its native substrate 500. During processing, the device is adhered to the substrate via a structural support tether 480 while an undercut is formed to allow removal from the native substrate. In FIG. 2B, device 150 is transferred to the target substrate 510 by breaking the device tether and moving the chiplet with an elastomer stamp. The target substrate can be of the same material family as the native substrate, or it can be of different materials. For example, the target substrate can be made of silicon, glass, sapphire, plastic, or organic materials.

Figure 3B:
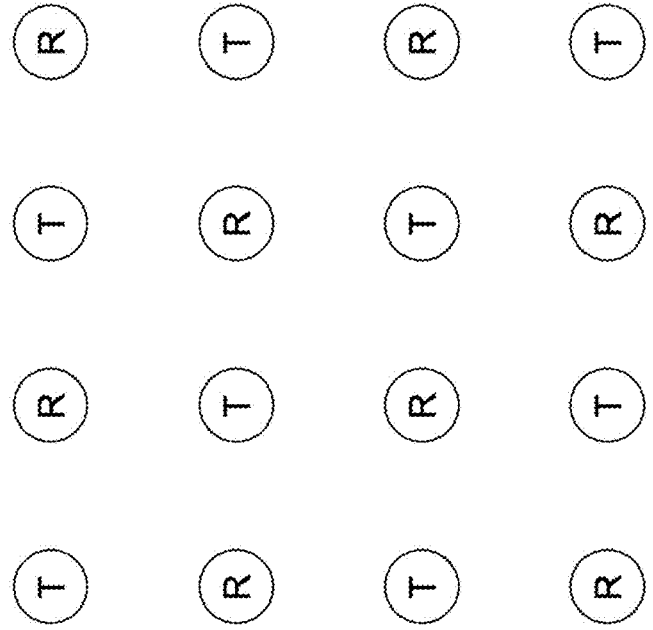
FIG. 3B is a schematic drawing of one subarray down-selected from the optical array of FIG. 3A.
Figure 3A:
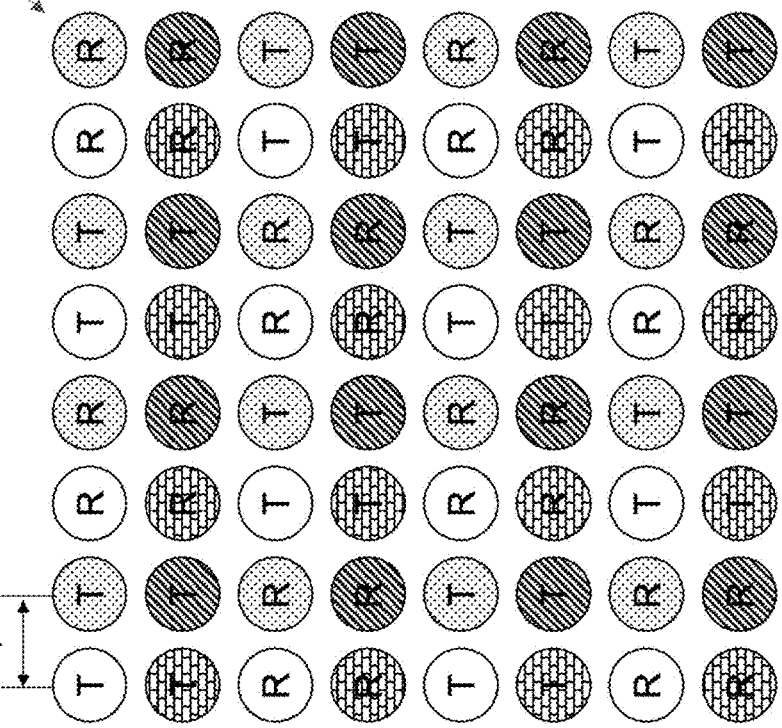
FIG. 3A is a schematic drawing of an optical array of transceivers.

FIG. 3A shows an embodiment where 2×2 emitters and 2×2 detectors are printed (one print per device type) on a substrate, providing one primary and three redundant (interleaved) subarrays. These can come from the same print from the same wafer, providing the option to choose the best of four subarrays. Each of the four subarrays are identified in FIG. 3A by the pattern of the circles representing the array. Subarray 532 has white circles, subarray 533 has dotted circles, subarray 534 has brick-patterned circles and subarray 535 has striped circles.

In the example of FIG. 3A, redundant emitters and detectors are mass-transfer printed to provide multiple solutions to select from at screening time to improve the overall yield. The physical layer on the silicon logic die contains one transmitter per group of emitters and one receiver per group of detectors with switch circuitry to select the preferred subarray. The preferred subarray can be configured in software at run time and stored into non-volatile memory (e.g. fuses) after screening is completed. When the silicon logic physical layer area is dominant, then the device redundancy comes without a penalty to system performance.

Assume that four subarrays of 1000 devices are printed with a 99.9% device yield. The expected failed devices per subarray is 1 device (1000×(1−0.999)) and the probability that any given subarray has 100% yield is $0.999^{1000}=\sim36.8\%$. Having the option to choose the best solution from the 4 subarrays gives $1-(1-0.368)^4=\sim84.0\%$ likelihood that at least one subarray has 100% yielded devices. Another option is to increase the print count and print each subarray from a different wafer or wafer lot. In this way, the yields are blended and a low yield (e.g., 99%) lot can be counteracted by a typical yielding lot (e.g., 99.9%). In this way, mass-transfer printing allows for blending devices from multiple wafers or wafer lots, to improve the overall yield.

The subarrays 532, 533, 534, 535 can be screened by activating and deactivating the emitters in various patterns and imaging the array to identify non-functioning devices, stuck-at-high, and stuck-at-low. Similarly, the experiment can be repeated for detectors by illuminating the array in various patterns and reading the output state. An alternative to imaging is to do an electrical functional test using the underlying circuitry (not shown) with sensing capability post-transferring. The best performing subarray is then targeted during the alignment process of the multi-core fiber and selected for interface to the physical layer through electrical switches.

FIG. 3B is a schematic drawing of one subarray 532 down-selected from the optical array 530 of FIG. 3A. In this case subarray 532 had the best performance and was chosen for use.

Figure 4:
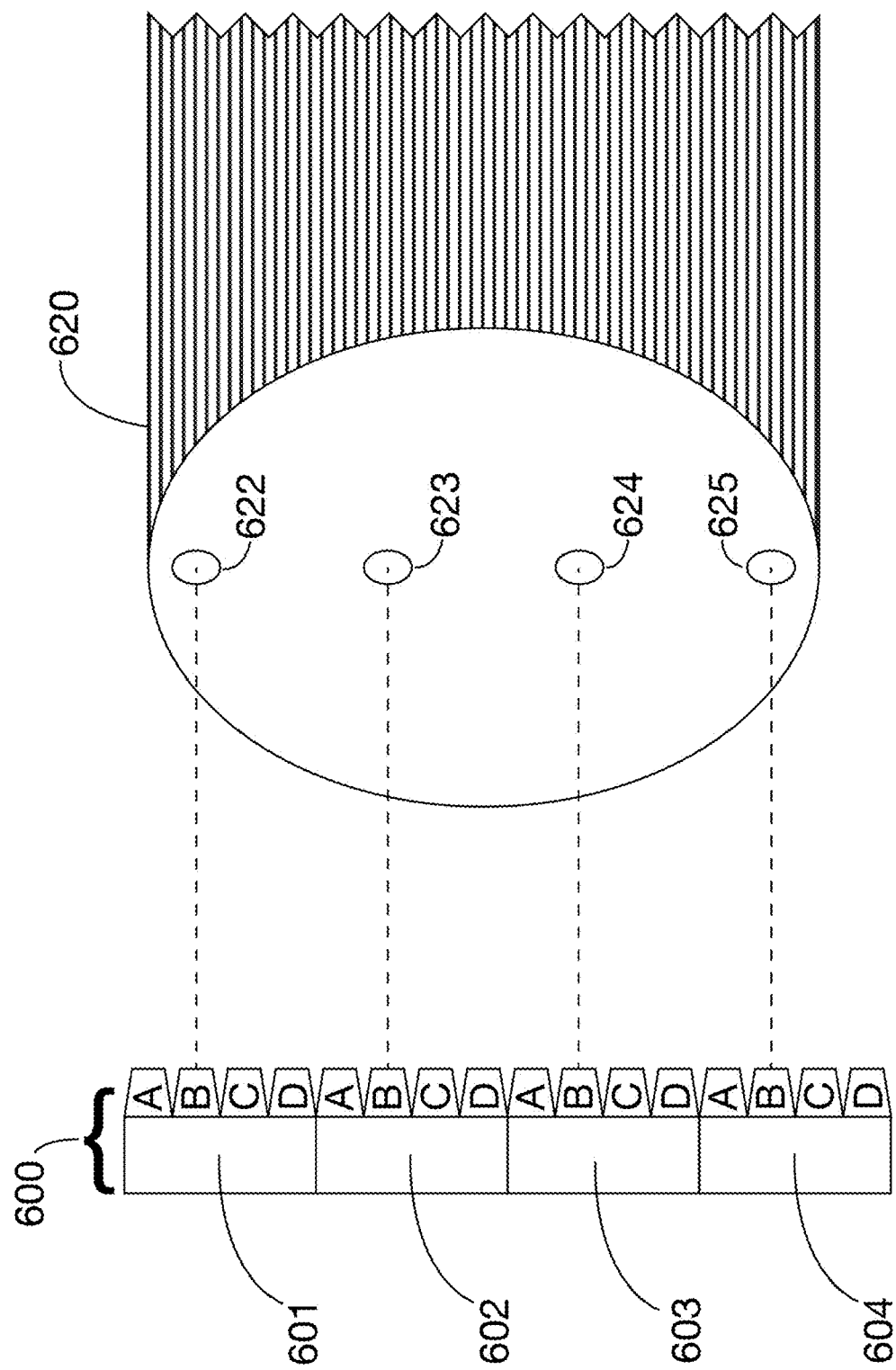
FIG. 4 is a side schematic drawing of arrays of optical elements used in conjunction with an optical system.

FIG. 4 is a side view isometric drawing of an interleaved array of devices 600 used with a multicore fiber 620 having cores 622, 623, 624, and 625. Array 600 is shown as 2-dimensional for clarity. In this embodiment, the emitters and detectors of array 600 are closely spaced compared to the cores multi-core fiber 620 such that any subarray is aligned to the multi-core fiber cores.

The first sub-array of elements comprises 601A, 602A, 603A, and 604A. The second sub-array of elements comprises 601B, 602B, 603B, and 604B. The third sub-array of elements comprises 601C, 602C, 603C, and 604C. The fourth sub-array of elements comprises 601D, 602D, 603D, and 604D. 601 A, B, C, and D comprise a first group; 602 A, B, C, and D comprise a second group; 603 A, B, C, and D comprise a third group; and 604 A, B, C, and D comprise a fourth group. If the area of the optical transceiver is limited by the optoelectronic devices rather than the physical layer on the silicon logic die, the redundancy comes at no additional cost to the transceiver area. If sub-array 2 is selected, for example, elements 601B, 602B, 603B, and 604B are active and the other elements are dormant. Then 601B is aligned to core 622, 602B is aligned to core 623, 603B is aligned to core 624, and 604B is aligned to core 625. On the other hand, if sub-array 3 is selected, 601C is aligned to core 622, 602C is aligned to core 623, 603C is aligned to core 624, and 604C is aligned to core 625. In other words, cores 601A, 601B, 601C, and 601D are close enough together that core 622 can accept signals from (or provide signals to) any of the three without adjustment. Similarly, multicore fiber 620 can accept inputs from (or provide inputs to) array 1, array 2, array 3, or array 4 without any adjustments being required. While a multicore fiber is shown in this example, the fiber could be replaced with an optical system such as a waveguide, waveguide array, beam shapers, or beam combiners that accepts multiple inputs or outputs spaced in the same matter as 622, 623, 624, and 625 that can be aligned to various sub-arrays.

In one embodiment, the redundant emitters are reserved as "cold spares" where they are not selected to emit until they are needed to replace another failing element. This has the effect of extending the lifetime of the redundant emitter by avoiding performance degradation due to standard operation when the device is not being utilized for communication.

In another embodiment, redundant emitters are utilized to reduce the data rate of the primary device, thereby reducing the device current for an extended lifetime. In case of a failure in the primary device, the data rate and device current of the redundant device are increased to maintain system speed operation.

While the exemplary preferred embodiments of the present invention are described herein with particularity, those skilled in the art will appreciate various changes, additions, and applications other than those specifically mentioned, which are within the spirit of this invention. For example, other redundancy patterns may be used, including but not limited to 1×2, 2×1, 2×3, 3×2, and 3×3. Visual screening and subarray selection may be done through electrical tests. Other screening may be performed via non-contact methods (e.g., pumping VCSEL with an external light source).

We claim:

1. An optoelectronic device comprising:
   a first array of optical elements formed on a substrate;
   a second array of optical elements formed on the substrate;
   a mechanism for selecting and activating optical elements of the first array or selecting and activating optical elements of the second array; and
   wherein each element from the first array forms a pair with an element from the second array; and
   wherein each pair of elements is disposed close enough together that an adjacent optical system can accept signals from either the first array or the second array without adjustment.

2. The optoelectronic device of claim 1 further comprising a third array of optical elements formed on the substrate;
   wherein the mechanism can further select and activate optical elements of the third array of optical elements;
   wherein each element from the third array forms a group of elements with one of the pairs of elements; and
   wherein each element within a group of elements is close enough to the other elements within that group of elements that the adjacent optical system can accept signals from the third array without adjustment.

3. The optoelectronic device of claim 2, wherein one of the arrays of elements is reserved as cold spares to extend the system lifetime.

4. The optoelectronic device of claim 1, wherein the second array of elements are reserved as cold spares to extend system lifetime.

5. The optoelectronic device of claim 1, wherein pairs of elements comprise separate mesa structures that are disposed on one chiplet and are configured to form a three-terminal device.

6. The optoelectronic device of claim 1 wherein the elements are some combination of optical emitters, photodetectors, and/or modulators.

7. The optoelectronic device of claim 1, wherein pairs of elements are combined on one chiplet with a common mesa structure and are configured to form as a three-terminal device and wherein the elements of the pairs are electrically isolated from each other.

8. The optoelectronic device of claim 7 wherein the pairs of elements are isolated from each other either by ion implantation, doping profiles, or etching.

9. The optoelectronic device of claim 1, wherein the first array and the second array are interleaved in grid pattern.

10. The optoelectronic device of claim 1 wherein the mechanism for selecting and activating is configured to select and activate during a yield screening process.

11. The optoelectronic device of claim 1, further comprising a driving backplane made of a flexible material.

12. An optoelectronic device comprising:
    a first array of optical elements formed on a substrate;
    a second array of optical elements formed on the substrate, wherein each element from the second array forms a pair with an element from the first array;
    an optical system adjacent to the substrate and configured to communicate with optical elements on the substrate;
    an activating mechanism for selecting and activating optical elements of the first array or activating optical elements of the second array; and
    an aligning mechanism configured to align the optical system to the activated elements.

13. The optoelectronic device of claim 12 further comprising a third array of optical elements formed on the substrate; and
    wherein the activating mechanism is further configured to select and activate optical elements of the third array of optical elements;
    wherein each element from the third array forms a group of elements with one of the pairs of elements.

14. The optoelectronic device of claim 12 wherein the optical elements are some combination of optical emitters, photodetectors, and/or modulators.

15. The optoelectronic device of claim 12, wherein pairs of elements are combined on one chiplet with a common mesa structure and are configured to form a three-terminal device and wherein the elements of the pairs are electrically isolated from each other.

16. The optoelectronic device of claim 15 wherein the pairs of elements are isolated from each other either by ion implantation, doping profiles, or etching.

17. The optoelectronic device of claim 12, wherein the first array and the second array are interleaved in grid pattern.

18. The optoelectronic device of claim 12 wherein the activating mechanism is configured to operate during a yield screening process.

19. The optoelectronic device of claim 12 further comprising a driving backplane made of a flexible material.

* * * * *